(12) United States Patent
Stecher et al.

(10) Patent No.: US 7,536,461 B2
(45) Date of Patent: May 19, 2009

(54) SERVER RESOURCE ALLOCATION BASED ON AVERAGED SERVER UTILIZATION AND SERVER POWER MANAGEMENT

(75) Inventors: John Joseph Stecher, Rochester, MN (US); Robert E. Wisniewski, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 678 days.

(21) Appl. No.: 11/186,607

(22) Filed: Jul. 21, 2005

(65) Prior Publication Data
US 2007/0094379 A1    Apr. 26, 2007

(51) Int. Cl.
G06F 15/173 (2006.01)
G06F 9/46 (2006.01)
G06F 1/00 (2006.01)

(52) U.S. Cl. .................... 709/226; 709/224; 718/104; 713/300

(58) Field of Classification Search ............ None
See application file for complete search history.

(56) References Cited

U.S. PATENT DOCUMENTS 5,892,754 A * 4/1999 Kompella et al. ............ 370/236
7,054,943 B1 * 5/2006 Goldszmidt et al. ......... 709/229
2003/0005028 A1 * 1/2003 Dritschler et al. ........... 709/104
2005/0102398 A1 * 5/2005 Zhang et al. ................. 709/225
2005/0265362 A1 * 12/2005 Kawashima et al. ......... 370/401

* cited by examiner

Primary Examiner—Wen-Tai Lin
(74) Attorney, Agent, or Firm—Owen J. Gamon

(57) ABSTRACT

A method, apparatus, system, and signal-bearing medium that, in an embodiment, calculate the average number of servers that executed an application in a previous time period, decide whether the current number of servers that execute the application is less than the average number of servers, and, if so, power on the average number of servers. The application is then distributed across the average number of servers. In an embodiment, the server is powered on by increasing the clock speed of the processors associated with the servers. In an embodiment, a determination is periodically made whether the response time of the application is greater than a threshold, and, if so, the servers are powered on and the application is distributed across the servers. In an embodiment, a determination is periodically made whether the response time of the application is less than a threshold, and, if so, servers are powered off and the application is distributed across the remaining servers.

20 Claims, 5 Drawing Sheets

| TIME | NUMBER OF SERVERS EXECUTING APPLICATION A | NUMBER OF SERVERS EXECUTING APPLICATION B |
|---|---|---|
| 00:00 | 4 | 5 |
| 00:15 | 6 | 4 |
| 00:30 | 8 | 15 |
| 00:45 | 2 | 8 |

SERVER DATA

FIG. 2

SERVER RESOURCE ALLOCATION BASED ON AVERAGED SERVER UTILIZATION AND SERVER POWER MANAGEMENT

FIELD

This invention generally relates to computer systems and more specifically relates to power management for server computer systems.

BACKGROUND

The development of the EDVAC computer system of 1948 is often cited as the beginning of the computer era. Since that time, computer systems have evolved into extremely sophisticated devices, and computer systems may be found in many different settings. Computer systems typically include a combination of hardware, such as semiconductors and circuit boards, and software, also known as computer programs. As advances in semiconductor processing and computer architecture push the performance of the computer hardware higher, more sophisticated computer software has evolved to take advantage of the higher performance of the hardware, resulting in computer systems today that are much more powerful than just a few years ago.

One use of these more powerful computer systems is to implement application servers, which execute applications and provide services for security, data access, and persistence. Application servers are often distributed across a cluster of multiple server computer systems, which may respond to requests from client computer systems. In order to respond to requests from many clients simultaneously, a cluster of servers may include large numbers of computer systems. Large numbers of servers require a significant amount of electricity for both power and cooling, which may cost millions or even tens of millions of dollars per year.

Customers naturally want to find a way to lower this significant cost of operating the servers. One technique for lowering the operating costs recognizes that the number of client requests varies over time and that many current processors provide the ability to dynamically raise and lower their clock speeds, e.g., via an API (application programming interface). Hence, this technique lowers the clock speed of selected processors in selected servers when these processors are not needed and raises the clock speed when the processors are needed. Lowering the clock speed of a processor reduces its power consumption, which can provide a significant cost savings. Unfortunately, lowering the clock speed of processors may also impact the response time of an application that is executing on the server because increasing the clock speed of a processor takes time, during which the client may wait for a response to its request.

Hence, what is needed is a technique for selectively lowering the processing speed of processors during times of low usage while still maintaining an acceptable response time to client requests.

SUMMARY

A method, apparatus, system, and signal-bearing medium are provided that, in an embodiment, calculate the average number of servers that executed an application in a previous time period, decide whether the current number of servers that execute the application is less than the average number of servers, and, if so, power on the average number of servers. The application is then distributed across the average number of servers. In an embodiment, the server is powered on by increasing the clock speed of the processors associated with the servers. In an embodiment, a determination is periodically made whether the response time of the application is greater than a threshold, and, if so, the servers are powered on and the application is distributed across the servers. In an embodiment, a determination is periodically made whether the response time of the application is less than a threshold, and, if so, servers are powered off and the application is distributed across the remaining servers.

BRIEF DESCRIPTION OF THE DRAWINGS

Various embodiments of the present invention are hereinafter described in conjunction with the appended drawings:

FIG. 2 depicts a block diagram of example server data, according to an embodiment of the invention.

It is to be noted, however, that the appended drawings illustrate only example embodiments of the invention, and are therefore not considered limiting of its scope, for the invention may admit to other equally effective embodiments.

DETAILED DESCRIPTION

Figure 1:
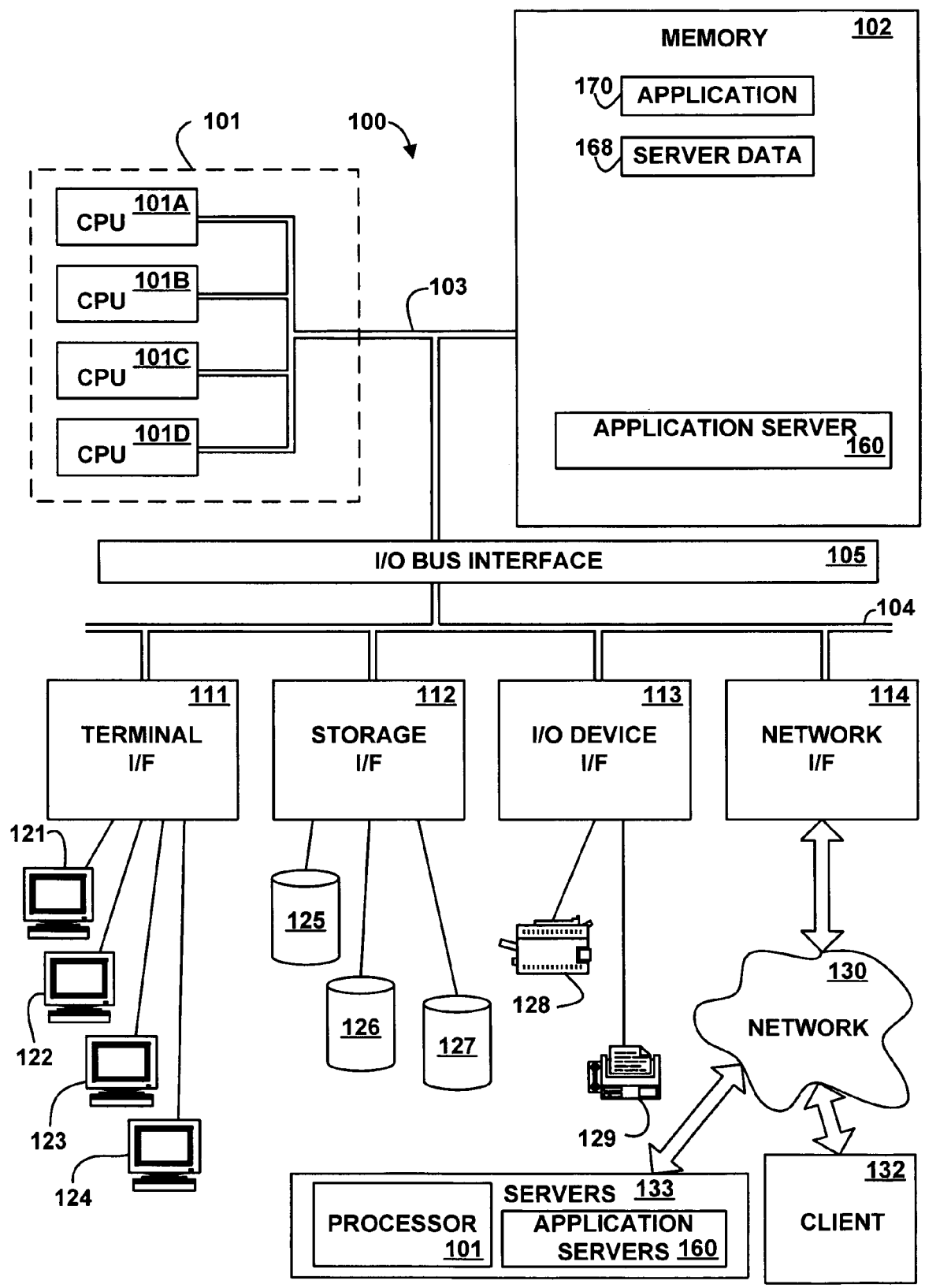
FIG. 1 depicts a high-level block diagram of an example system for implementing an embodiment of the invention.

Referring to the Drawings, wherein like numbers denote like parts throughout the several views, FIG. 1 depicts a high-level block diagram representation of a computer system 100 connected via a network 130 to a client 132 and servers 133, according to an embodiment of the present invention. The terms "computer," "client," and "server" are used for convenience only, and an electronic device that acts as a server in one embodiment may act as a client in another embodiment, and vice versa. In an embodiment, the hardware components of the computer system 100 may be implemented by an eServer iSeries computer system available from International Business Machines of Armonk, N.Y. However, those skilled in the art will appreciate that the mechanisms and apparatus of embodiments of the present invention apply equally to any appropriate computing system.

The major components of the computer system 100 include one or more processors 101, a main memory 102, a terminal interface 111, a storage interface 112, an I/O (Input/Output) device interface 113, and communications/network interfaces 114, all of which are coupled for inter-component communication via a memory bus 103, an I/O bus 104, and an I/O bus interface unit 105.

The computer system 100 contains one or more general-purpose programmable central processing units (CPUs) 101A, 101B, 101C, and 101D, herein generically referred to as the processor 101. In an embodiment, the computer system 100 contains multiple processors typical of a relatively large system; however, in another embodiment the computer system 100 may alternatively be a single CPU system. Each processor 101 executes instructions stored in the main memory 102 and may include one or more levels of on-board cache.

The main memory 102 is a random-access semiconductor memory for storing data and programs. In another embodiment, the main memory 102 represents the entire virtual memory of the computer system 100, and may also include the virtual memory of other computer systems coupled to the computer system 100 or connected via the network 130. The main memory 102 is conceptually a single monolithic entity, but in other embodiments the main memory 102 is a more complex arrangement, such as a hierarchy of caches and other memory devices. For example, the main memory 102 may exist in multiple levels of caches, and these caches may be further divided by function, so that one cache holds instructions while another holds non-instruction data, which is used by the processor or processors. The main memory 102 may be further distributed and associated with different CPUs or sets of CPUs, as is known in any of various so-called non-uniform memory access (NUMA) computer architectures.

The main memory 102 includes an application server 160, server data 168, and an application 170. Although the application server 160, the server data 168, and the application 170 are illustrated as being contained within the memory 102 in the computer system 100, in other embodiments some or all of them may be on different computer systems and may be accessed remotely, e.g., via the network 130. The computer system 100 may use virtual addressing mechanisms that allow the programs of the computer system 100 to behave as if they only have access to a large, single storage entity instead of access to multiple, smaller storage entities. Thus, while the application server 160, the server data 168, and the application 170 are illustrated as being contained within the main memory 102, these elements are not necessarily all completely contained in the same storage device at the same time. Further, although the application server 160, the server data 168, and the application 170 are illustrated as being separate entities, in other embodiments some of them, or portions of some of them, may be packaged together.

In an embodiment, the application server 160 is a component-based product (e.g., an enhanced WebSphere product) that resides in the middle-tier of a server-centric architecture and provides middleware services for security and state maintenance, along with data access and persistence. In an embodiment, the application server 160 is a Java application server based on the Java 2 Platform, Enterprise Edition (J2EE), but in other embodiments any appropriate platform may be used. J2EE uses a multi-tier distributed model, which generally includes a client tier, a middle tier, and an EIS (Enterprise Information System) tier. The client tier can be one or more applications or browsers. The J2EE Platform is in the middle tier and consists of a web server and an EJB (Enterprise Java Beans) server. (These servers are also called "containers.") Additional sub-tiers in the middle tier may also exist. The EIS tier has the existing applications, files, and databases. For the storage of business data, the J2EE platform uses a database that is accessible through a JDBC (Java Database Connectivity), SQLJ (Structured Query Language for Java), or JDO API (Java Data Objects Application Program Interface). The database may be accessible from web components, enterprise beans, and application client components.

The application server 160 creates the server data 168, powers the servers 133 on and off, and load distributes the application servers 160 that execute the applications 170 across the servers 133. The application server 160 includes instructions capable of executing on the processor 101 or statements capable of being interpreted by instructions executing on the processor 101 to perform the functions as further described below with reference to FIGS. 3, 4, and 5. In another embodiment, the application server 160 may be implemented in microcode or firmware. In another embodiment, the application server 160 may be implemented in hardware via logic gates and/or other appropriate hardware techniques in lieu of or in addition to a processor-based system.

The application 170 may be a user application, a third-party application, an operating system, or any portion thereof, which is capable of being executed by the application server 160. The server data 168 includes historical information regarding the number of the servers 133 that were powered on and running the applications 170. The server data 168 is further described below with reference to FIG. 2.

The memory bus 103 provides a data communication path for transferring data among the processor 101, the main memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104. The system I/O bus 104 may be, e.g., an industry standard PCI bus, or any other appropriate bus technology.

The I/O interface units support communication with a variety of storage and I/O devices. For example, the terminal interface unit 111 supports the attachment of one or more user terminals 121, 122, 123, and 124. The storage interface unit 112 supports the attachment of one or more direct access storage devices (DASD) 125, 126, and 127 (which are typically rotating magnetic disk drive storage devices, although they could alternatively be other devices, including arrays of disk drives configured to appear as a single large storage device to a host). The contents of the main memory 102 may be stored to and retrieved from the direct access storage devices 125, 126, and 127, as needed.

The I/O and other device interface 113 provides an interface to any of various other input/output devices or devices of other types. Two such devices, the printer 128 and the fax machine 129, are shown in the exemplary embodiment of FIG. 1, but in other embodiment many other such devices may exist, which may be of differing types. The network interface 114 provides one or more communications paths from the computer system 100 to other digital devices and computer systems; such paths may include, e.g., one or more networks 130.

Although the memory bus 103 is shown in FIG. 1 as a relatively simple, single bus structure providing a direct communication path among the processors 101, the main memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 105 and the I/O bus 104 are shown as single respective units, the computer system 100 may in fact contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

The computer system 100 depicted in FIG. 1 has multiple attached terminals 121, 122, 123, and 124, such as might be typical of a multi-user "mainframe" computer system. Typically, in such a case the actual number of attached devices is greater than those shown in FIG. 1, although the present invention is not limited to systems of any particular size. The computer system 100 may alternatively be a single-user system, typically containing only a single user display and keyboard input, or might be a server or similar device which has little or no direct user interface, but receives requests from other computer systems (clients). In other embodiments, the computer system 100 may be implemented as a personal computer, portable computer, laptop or notebook computer, PDA (Personal Digital Assistant), tablet computer, pocket computer, telephone, pager, automobile, teleconferencing system, appliance, or any other appropriate type of electronic device.

The network 130 may be any suitable network or combination of networks and may support any appropriate protocol suitable for communication of data and/or code to/from the computer system 100. In various embodiments, the network 130 may represent a storage device or a combination of storage devices, either connected directly or indirectly to the computer system 100. In an embodiment, the network 130 may support Infiniband. In another embodiment, the network 130 may support wireless communications. In another embodiment, the network 130 may support hard-wired communications, such as a telephone line or cable. In another embodiment, the network 130 may support the Ethernet IEEE (Institute of Electrical and Electronics Engineers) 802.3x specification. In another embodiment, the network 130 may be the Internet and may support IP (Internet Protocol).

In another embodiment, the network 130 may be a local area network (LAN) or a wide area network (WAN). In another embodiment, the network 130 may be a hotspot service provider network. In another embodiment, the network 130 may be an intranet. In another embodiment, the network 130 may be a GPRS (General Packet Radio Service) network. In another embodiment, the network 130 may be a FRS (Family Radio Service) network. In another embodiment, the network 130 may be any appropriate cellular data network or cell-based radio network technology. In another embodiment, the network 130 may be an IEEE 802.11B wireless network. In still another embodiment, the network 130 may be any suitable network or combination of networks. Although one network 130 is shown, in other embodiments any number (including zero) of networks (of the same or different types) may be present.

The client 132 and/or the servers 133 may include some or all of the hardware and/or software elements previously described above for the computer system 100. In another embodiment, the client 132 and/or the servers 133 are part of the computer system 100. The servers 133 may include additional instances of the application servers 160 executing the applications 170 on the processors 101.

It should be understood that FIG. 1 is intended to depict the representative major components of the computer system 100, the network 130, the client 132, and the servers 133 at a high level, that individual components may have greater complexity than represented in FIG. 1, that components other than or in addition to those shown in FIG. 1 may be present, and that the number, type, and configuration of such components may vary. Several particular examples of such additional complexity or additional variations are disclosed herein; it being understood that these are by way of example only and are not necessarily the only such variations.

The various software components illustrated in FIG. 1 and implementing various embodiments of the invention may be implemented in a number of manners, including using various computer software applications, routines, components, programs, objects, modules, data structures, etc., referred to hereinafter as "computer programs," or simply "programs." The computer programs typically comprise one or more instructions that are resident at various times in various memory and storage devices in the computer system 100, and that, when read and executed by one or more processors 101 in the computer system 100, cause the computer system 100 to perform the steps necessary to execute steps or elements comprising the various aspects of an embodiment of the invention.

Moreover, while embodiments of the invention have and hereinafter will be described in the context of fully-functioning computer systems, the various embodiments of the invention are capable of being distributed as a program product in a variety of forms, and the invention applies equally regardless of the particular type of signal-bearing medium used to actually carry out the distribution. The programs defining the functions of this embodiment may be delivered to the computer system 100 via a variety of tangible signal-bearing media, which include, but are not limited to the following computer-readable media:

(1) information permanently stored on a non-rewriteable storage medium, e.g., a read-only memory storage device attached to or within a computer system, such as a CD-ROM, DVD-R, or DVD+R;

(2) alterable information stored on a rewriteable storage medium, e.g., a hard disk drive (e.g., the DASD 125, 126, or 127), CD-RW, DVD-RW, DVD+RW, DVD-RAM, or diskette; or (3) information conveyed by a communications or transmissions medium, such as through a computer or a telephone network, e.g., the network 130.

Such tangible signal-bearing media, when carrying or encoded with computer-readable, processor-readable, or machine-readable instructions that direct the functions of the present invention, represent embodiments of the present invention.

Embodiments of the present invention may also be delivered as part of a service engagement with a client corporation, nonprofit organization, government entity, internal organizational structure, or the like. Aspects of these embodiments may include configuring a computer system to perform, and deploying software systems and web services that implement, some or all of the methods described herein. Aspects of these embodiments may also include analyzing the client company, creating recommendations responsive to the analysis, generating software to implement portions of the recommendations, integrating the software into existing processes and infrastructure, metering use of the methods and systems described herein, allocating expenses to users, and billing users for their use of these methods and systems.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or software environments may be used without departing from the scope of the invention.

FIG. 2 depicts a block diagram of example server data 168, according to an embodiment of the invention. The server data 168 includes records 205, 210, 215, and 220, but in other embodiments any number of records with any appropriate data may be present. Each of the records includes a time field 225 and any number of server fields, such as the server fields 230 and 240. In other embodiments, more or fewer fields may be present. The time field 225 indicates the time associated with the data in the server fields 230 and 240, such as the time that the data was collected. Each of the server fields 230 and 240 indicates the number of servers that were executing an application 170 at the associated time 225. For example, the record 205 indicates that at the time 225 of "00:00," the number of servers 230 executing an application "A" 170 was "4" and the number of servers 240 executing an application "B" 170 was "5."

Figure 3:
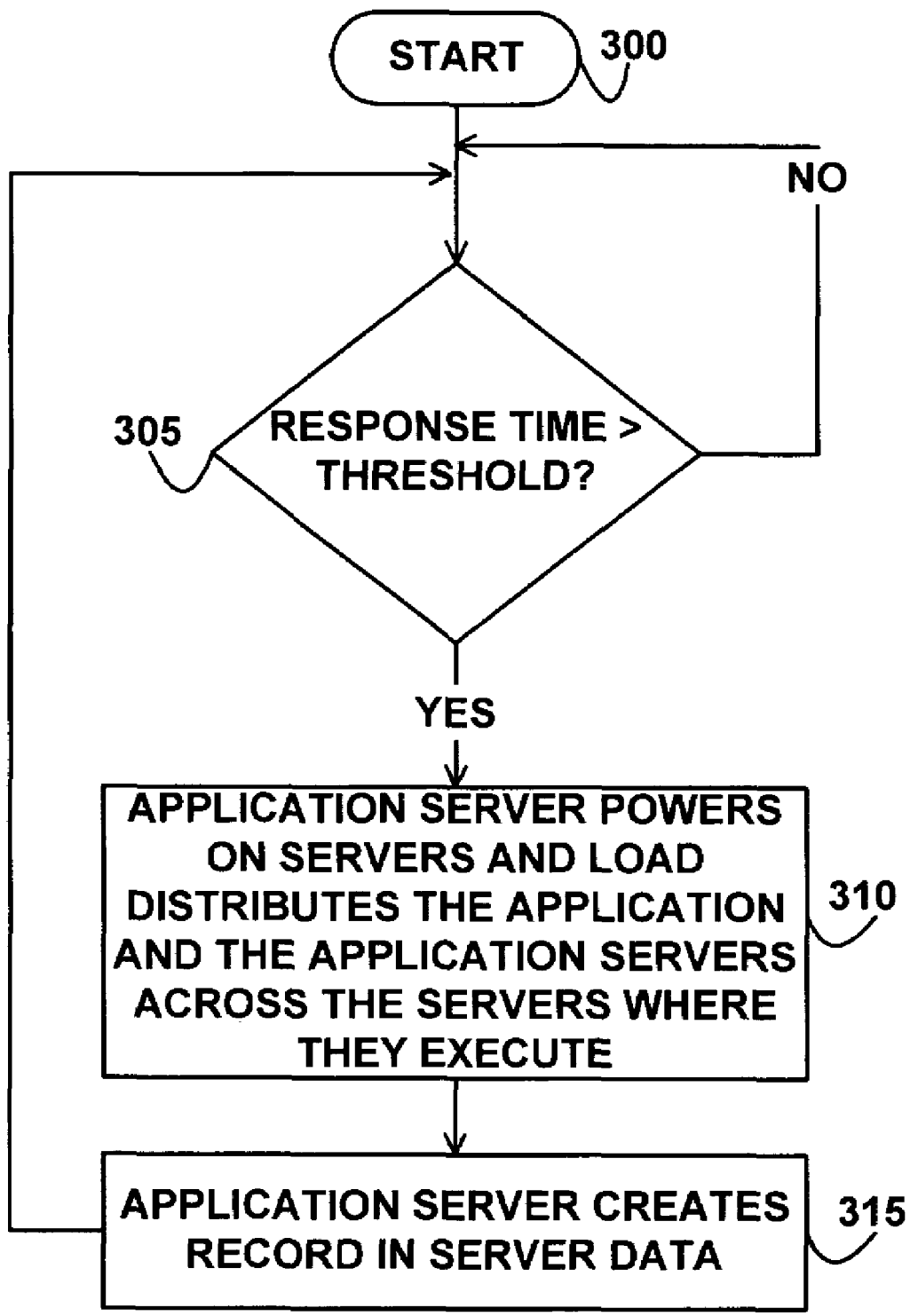
FIG. 3 depicts a flowchart of example processing for powering on servers, according to an embodiment of the invention.

FIG. 3 depicts a flowchart of example processing for powering on the servers 133, according to an embodiment of the invention. Control begins at block 300. Control then continues to block 305 where the application server 160 periodically determines whether the response time for the application 170 in processing requests from the clients 132 is greater than a threshold. If the determination at block 305 is true, then the response time for the application 170 is greater than the threshold, so control continues to block 310 where the application server 160 powers on selected of the servers 133 and/or increases the clock speed of selected processors 101 at the selected servers 133 and load distributes the application servers 160 and the applications 170 across the powered-on servers 133, where they execute. Control then continues to block 315 where the application server 160 creates a record in the server data 168 and stores the number of the servers 133 that are currently executing the application 170 and the current time 225 in the created record, e.g., in the number of servers field 230 or 240. Control then returns to block 305, as previously described above.

If the determination at block 305 is false, then the response time for the application 170 in processing requests from the clients 132 is not greater than the threshold, so control returns to block 305, as previously described above.

Figure 4:
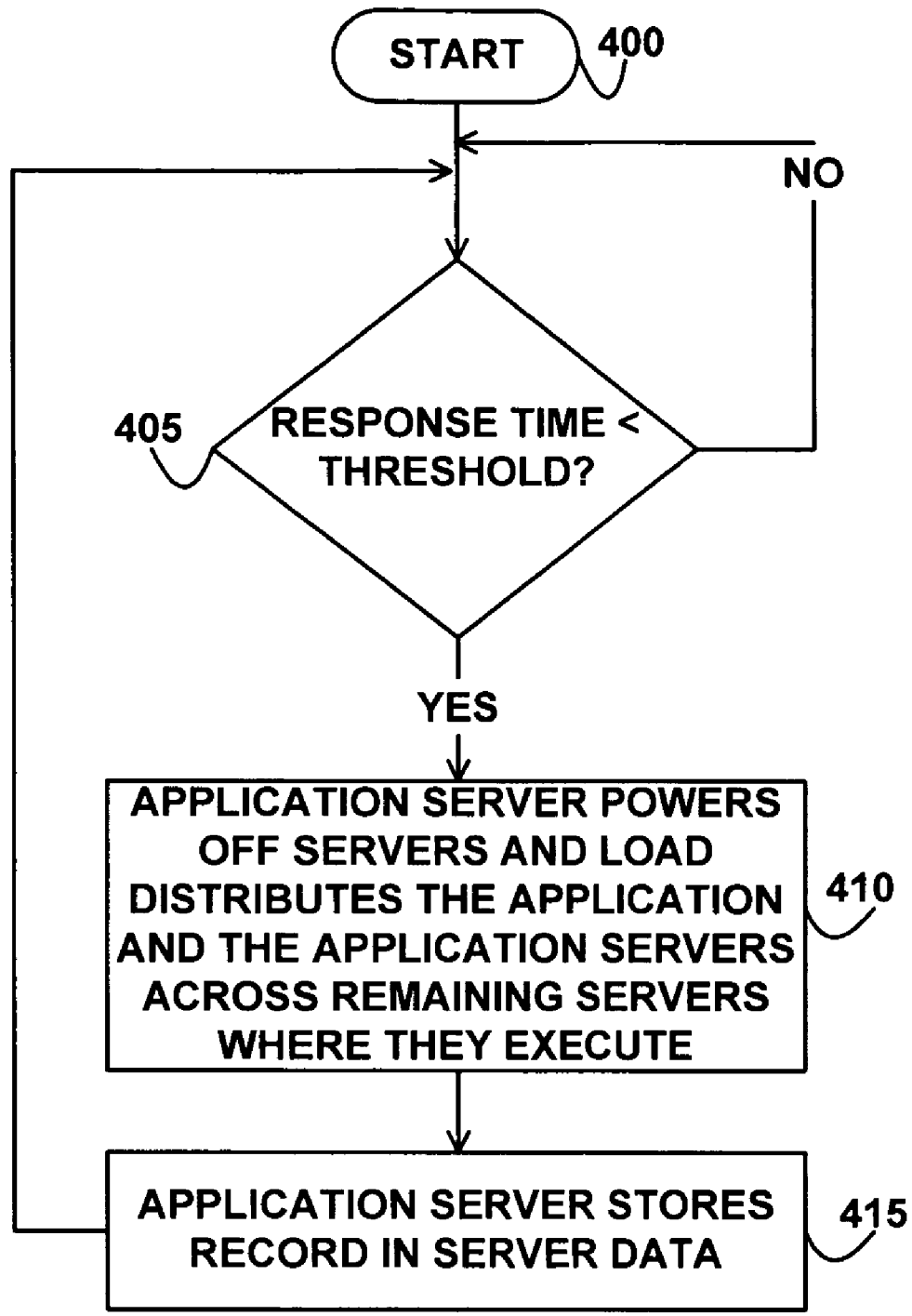
FIG. 4 depicts a flowchart of example processing for powering off servers, according to an embodiment of the invention.

FIG. 4 depicts a flowchart of example processing for powering off the servers 133, according to an embodiment of the invention. Control begins at block 400. Control then continues to block 405 where the application server 160 periodically determines whether the response time for the application 170 in processing requests from the clients 132 is less than a threshold. The threshold of block 405 may be the same or different from the threshold of block 305.

If the determination at block 405 is true, then the response time for the application 170 is less than the threshold, so control continues to block 410 where the application server 160 powers off a selected number of the servers 133 and/or decreases the clock speed of a selected number of processors 101 at the selected servers 133 and load redistributes the application servers 160 and the applications 170 across any remaining powered-on servers 133, where they execute. Control then continues to block 415 where the application server 160 creates a record in the server data 168 and stores the number of the servers 133 that are currently executing the application 170, e.g., in the field 230 or 240, and the current time 225 in the created record. Control then returns to block 405, as previously described above.

If the determination at block 405 is false, then the response time for the application 170 in processing requests from the clients 132 is not less than the threshold, so control returns to block 405, as previously described above.

Figure 5:
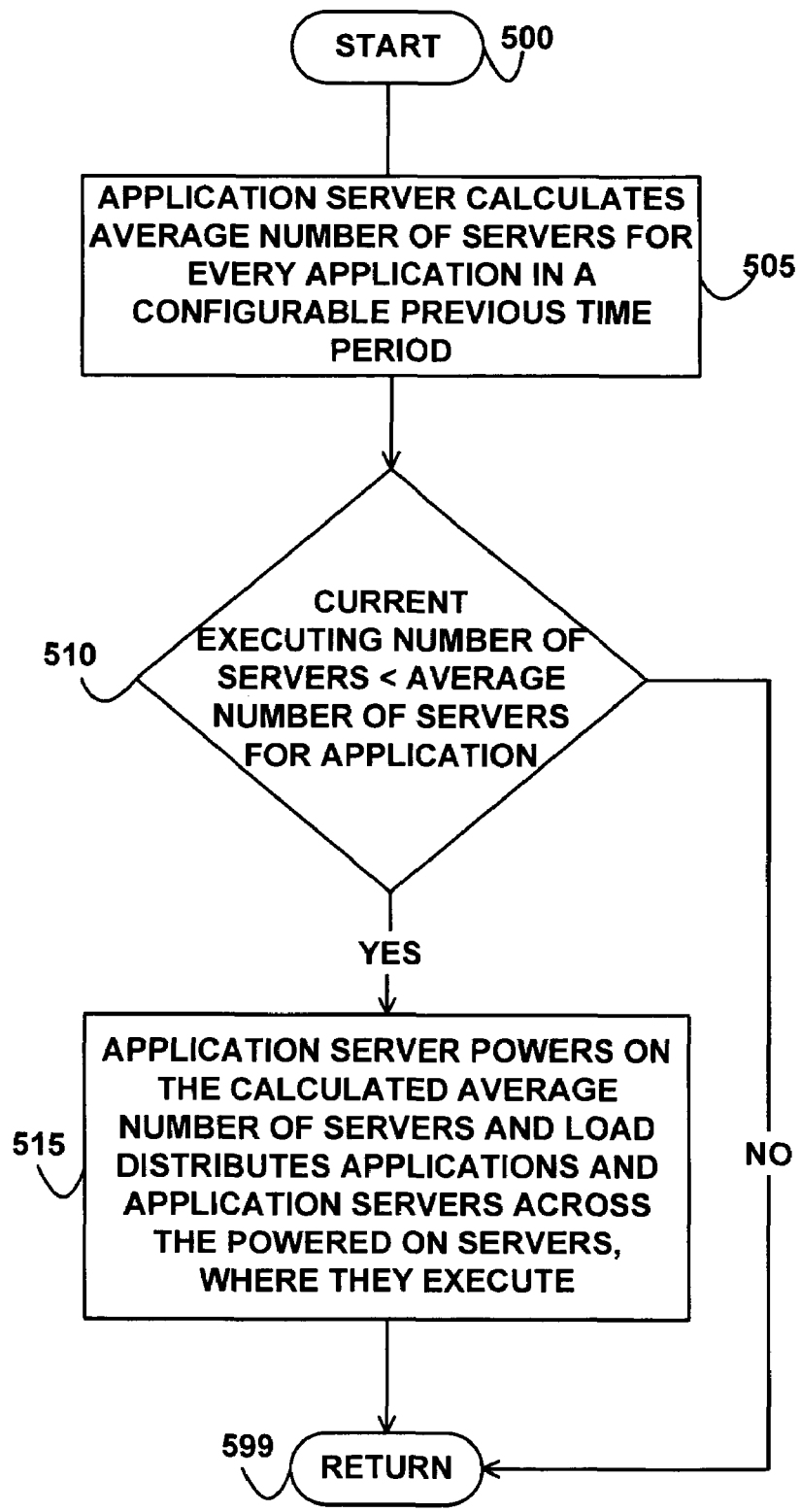
FIG. 5 depicts a flowchart of example processing for powering on servers based on an average number of servers powered on in a previous time period, according to an embodiment of the invention.

FIG. 5 depicts a flowchart of example processing for powering on the servers 133 based on an average number of the servers 133 that were powered on in a previous time period, according to an embodiment of the invention. Control begins at block 500. Control then continues to block 505 where the application server 160 calculates the historical average number of servers for every application 170 in a configurable window or period of the time 225 based, e.g., on the number of servers 230 and 240 in FIG. 2. For example, if the configurable time period is time "00:00" through time "00:30," then the application server 160 calculates the average for application A using the field 230 from records 205, 210, and 215 as (4+6+8)/3=6; and the application server 160 calculates the average for application B using the field 240 from records 205, 210, and 215 as (5+4+15)/3=8. The configurable window or period of the time 230 may be set by the client 132, the application 170, the application server 160, a user, a system administrator, or via any programmatic technique.

Control then continues to block 510 where the application server 160 determines, for each application 170, whether the current number of the servers 133 that are executing the application 170 is less than the average number of the servers 133 for that application 170, which was previously calculated at block 505. If the determination at block 510 is true, then control continues to block 515 where the application server 160 powers on the calculated average number of servers and/or increases the clock speed of selected processors 101 in the average number of servers 133 and load distributes the application 170 and the application servers 160 across the powered on servers 133, where they execute. For example, if the current number of the servers 133 executing application A is two and the average number of servers that executed application A during the configurable time period was six, then the application server 160 powers on four additional servers 133 (to yield six total) and load redistributes the application servers 160 and the application A 170 from executing on the two servers to executing on the six servers. Control then continues to block 599 where the logic of FIG. 5 returns.

If the determination at block 510 is false, then control continues to block 599 where the logic of FIG. 5 returns.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. Different instances of the word "embodiment" as used within this specification do not necessarily refer to the same embodiment, but they may. The previous detailed description is, therefore, not to be taken in a limiting sense, and the scope of the present invention is defined only by the appended claims.

In the previous description, numerous specific details were set forth to provide a thorough understanding of embodiments of the invention. But, the invention may be practiced without these specific details. In other instances, well-known circuits, structures, and techniques have not been shown in detail in order not to obscure the invention.

What is claimed is:

1. A computer-implemented method comprising:
   calculating an average number of servers that executed an application in a previous time period;
   deciding whether a current number of the servers that execute the application is less than the average number of the servers, wherein said average number includes non-integers;
   powering on an additional number of the servers if the current number of the servers that execute the application is less than the average number of the servers that executed the application in the previous time period, wherein the current number of the servers plus the additional number of the servers yields the average number of the servers; and refraining from powering on the additional number of servers if the current number of the servers that execute the application is not less than the average number of the servers.

2. The computer-implemented method of claim 1, further comprising:
distributing the application across the average number of servers if the deciding is true.

3. The computer-implemented method of claim 1, further comprising:
increasing the clock speed of processors associated with the servers if the current number of the servers that execute the application is less than the average number of the servers that executed the application in the previous time period.

4. The computer-implemented method of claim 1, further comprising:
periodically determining if a response time of the application is greater than a threshold; and
powering on first numbers of the servers if the periodically determining is true.

5. The computer-implemented method of claim 4, further comprising:
distributing the application across the first numbers of servers.

6. The computer-implemented method of claim 4, wherein the calculating further comprises:
calculating the average number based on the first numbers.

7. The computer-implemented method of claim 1, further comprising:
periodically determining if a response time of the application is less than a threshold;
powering off first numbers of the servers if the periodically determining is true; and
distributing the application across the servers that remain powered on.

8. A storage medium comprising instructions, wherein the instructions when executed comprise:
calculating an average number of servers that executed an application in a previous time period;
deciding whether a current number of the servers that execute the application is less than the average number of the servers, wherein said average number includes non-integers;
powering on an additional number of the servers if the current number of the servers that execute the application is less than the average number of the servers that executed the application in the previous time period, wherein the current number of the servers plus the additional number of the servers yields the average number of the servers; and
refraining from powering on the additional number of servers if the current number of the servers that execute the application is not less than the average number of the servers.

9. The storage medium of claim 8, further comprising:
distributing the application across the average number of servers if the deciding is true.

10. The storage medium of claim 8, further comprising:
increasing the clock speed of processors associated with the servers if the current number of the servers that execute the application is less than the average number of the servers that executed the application in then previous time period.

11. The storage medium of claim 8, further comprising:
periodically determining if a response time of the application is greater than a threshold; and
powering on first numbers of the servers if the periodically determining is true.

12. The storage medium of claim 11, further comprising:
distributing the application across the first numbers of servers.

13. The storage medium of claim 11, wherein the calculating further comprises:
calculating the average number based on the first numbers.

14. The storage medium of claim 8, wherein the calculating further comprises:
periodically determining if a response time of the application is less than a threshold; and
powering off first numbers of the servers if the periodically determining is true.

15. A computer-implemented method for configuring a computer, wherein the method comprises:
configuring the computer to calculate an average number of servers that executed an application in a previous time period;
configuring the computer to decide whether a current number of the servers that execute the application is less than the average number of the servers, wherein said average number includes non-intergers;
configuring the computer to power on an additional number of the servers if the current number of the servers that execute the application is less than the average number of the servers that executed the application in the previous time period, wherein the current number of the servers plus the additional number of the servers yields the average number of the servers; and
refraining from powering on the additional number of servers if the current number of the servers that execute the application is not less than the average number of the servers.

16. The computer-implemented method of claim 15, further comprising:
configuring the computer to distribute the application across the average number of servers if the deciding is true.

17. The computer-implemented method of claim 15, further comprising:
configuring the computer to increase the clock speed of processors associated with the servers if the current number of the servers that execute the application is less than the average number of the servers that executed the application in the previous time period.

18. The computer-implemented method of claim 15, further comprising:
configuring the computer to periodically determine if a response time of the application is greater than a threshold; and
configuring the computer to power on first numbers of the servers if the periodically determining is true.

19. The computer-implemented method of claim 18, further comprising:
configuring the computer to distribute the application across the first numbers of servers.

20. The computer-implemented method of claim 18, wherein the configuring the computer to calculate further comprises:
configuring the computer to calculate the average number based on the first numbers.

* * * * *